Nov. 28, 1961 R. BINDER 3,010,554
APPARATUS FOR OPERATING CLUTCHES
Filed Feb. 11, 1958 5 Sheets—Sheet 1

INVENTOR
Richard Binder
BY
Richards Geier
ATTORNEYS

Nov. 28, 1961   R. BINDER   3,010,554
APPARATUS FOR OPERATING CLUTCHES
Filed Feb. 11, 1958   5 Sheets—Sheet 2

INVENTOR
Richard Binder
BY
Richards Geier
ATTORNEYS

Nov. 28, 1961     R. BINDER     3,010,554
APPARATUS FOR OPERATING CLUTCHES
Filed Feb. 11, 1958     5 Sheets—Sheet 3
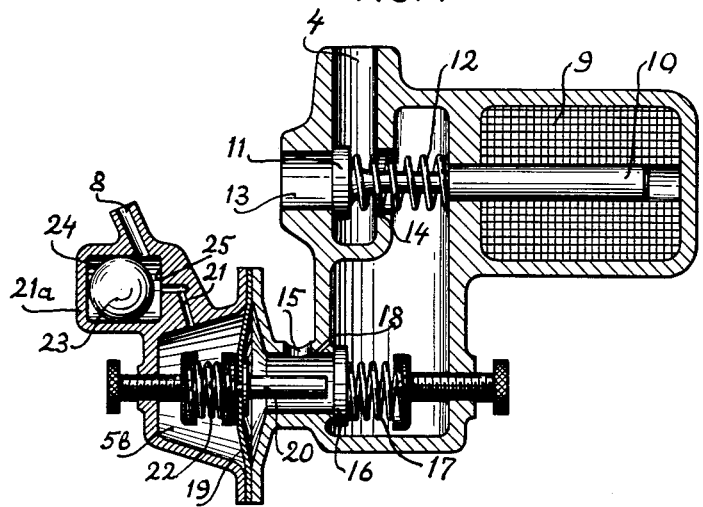
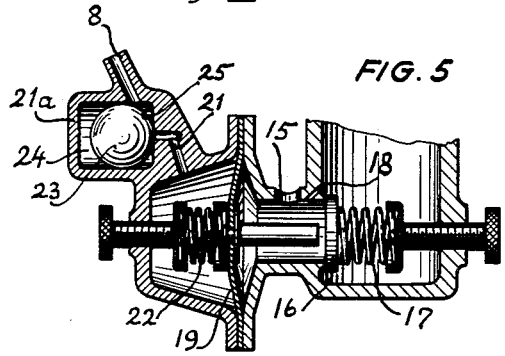
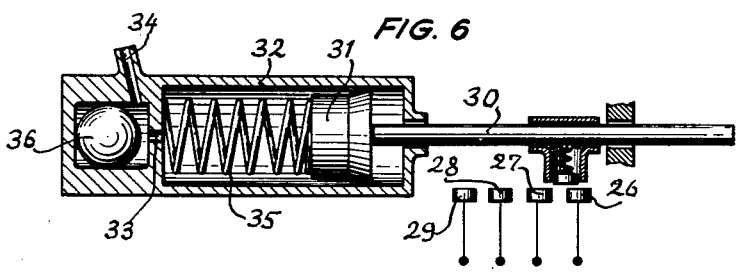
INVENTOR
Richard Binder
by
Richards & Geier
ATTORNEYS

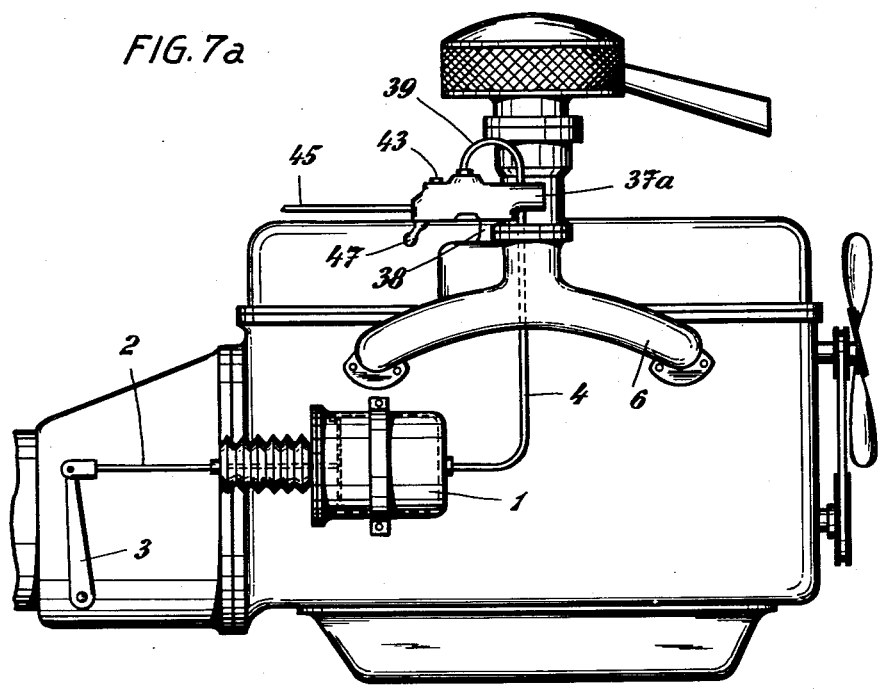

United States Patent Office 3,010,554
Patented Nov. 28, 1961

3,010,554
APPARATUS FOR OPERATING CLUTCHES
Richard Binder, Schweinfurt (Main), Germany, assignor to Fichtel & Sachs A.G., Schweinfurt (Main), Germany
Filed Feb. 11, 1958, Ser. No. 714,659
Claims priority, application Germany Mar. 16, 1957
4 Claims. (Cl. 192—.77)

This invention relates to an apparatus for operating an automatic clutch of the type used in vehicles and refers more particularly to a device for improving the controlling of the engagement operation of such clutches. The subject-matter of the present invention can be used in conjunction with all types of automatic clutches provided with operating or controlling means which, after the closing of the switch, provide a long and soft re-engagement of the clutch so long as no gas is given, while a quicker engagement of the clutch is produced when gas is given immediately after the actuation of the switch.

Practical experience has shown that devices of this type are necessary in actual practice, since otherwise during a return switching from a higher gear to a lower gear the movement of the vehicle is retarded in an unpleasant manner, or when the setting of the clutch engagement is sufficiently soft, there is an excessive sliding immediately after gas has been given after the switching to a higher gear. It was also found that this acceleration of the re-engagement process after the switching can become quite unpleasant for the driver if immediately after the switching from a higher to a lower gear gas is suddenly given. The quick engagement of the clutch produced by this sudden giving of gas results initially in a quite noticeable retardation of the movement of the vehicle and in an acceleration of this movement immediately thereafter, as soon as the number of revolutions of the motor has exceeded the number of revolutions of the driving shaft. This quick change from retardation to acceleration of the vehicle movements is an unpleasant experience for the driver and the passengers of the vehicle.

An object of the present invention is to provide means which eliminate this unpleasant experience, or which at least diminish the causes producing it to the extent that it will not be noticeable any more for the driver and the passengers.

Other objects of the present invention will become apparent in the course of the following specification.

The objects of the present invention may be realized through a construction wherein a regulating mass, which is influenced by the retardation and acceleration of the vehicle, operates upon the regulating device which steers the engagement of the clutch in such manner that the acceleration of the clutch engagement procedure does not take place at all, or takes place only slowly, so long as the movement of the vehicle is being retarded. According to the present invention, this regulating mass can be constructed and arranged in many different ways, for example, it can have the form of a pendulum; probably the simplest construction is that of a ball or sphere which is movable by inertia in the direction of the vehicle in a cylindrical bore, and which closes or opens the openings. It is also possible to provide direct mechanical actuation of the pendulum, for example, upon a steering or operating device, such as a diaphragm.

The invention will appear more clearly from the following detailed description when taken in connection with the accompanying drawings showing, by way of example, preferred embodiments of the inventive idea.

In the drawings:

FIGURE 4 is a section through a valve of the present invention provided with means preventing the influencing of the coupling operation through the drop in sub-pressure.

FIGURE 5 shows a portion of the apparatus illustrated in FIGURE 5 in a different position.

FIGURE 6 is a diagrammatic section through a different device for operating an electro-magnetic coupling.

FIGURE 7a is a diagrammatic side view illustrating the location of the valve shown in FIG. 7.

Figure 1:
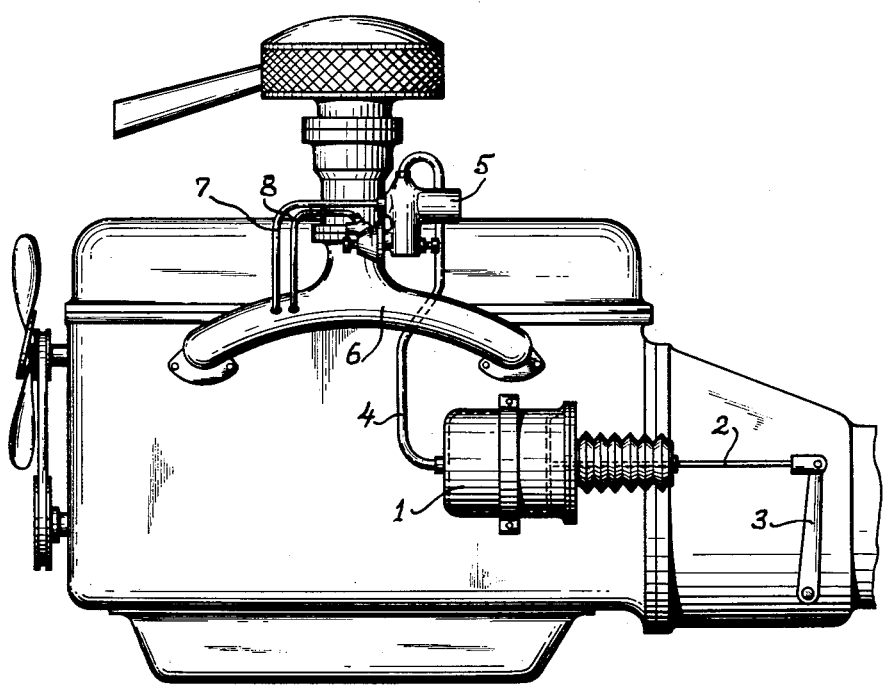
FIGURE 1 is a diagrammatic side view showing the general arrangement of means required for automatically operating the clutch by motor vacuum in an automobile engine.

FIGURE 1 shows a cylinder 1 of the servo-motor which is connected by a rod 2 with a lever 3 which operates the clutch. The servo-motor 1 is connected by pipe 4 with an operating valve 5, which is connected by pipes 7 and 8 with the suction pipe of the motor.

Figure 2:
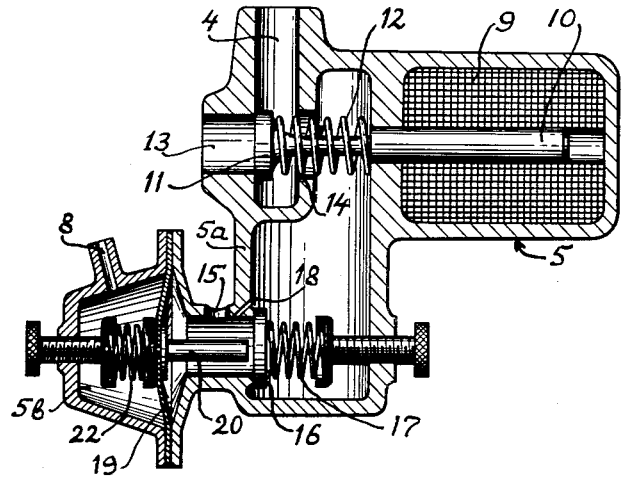
FIGURE 2 is a section through the valve for the clutch operated by vacuum, and illustrates the valve when it is closed during normal operation.
Figure 3:
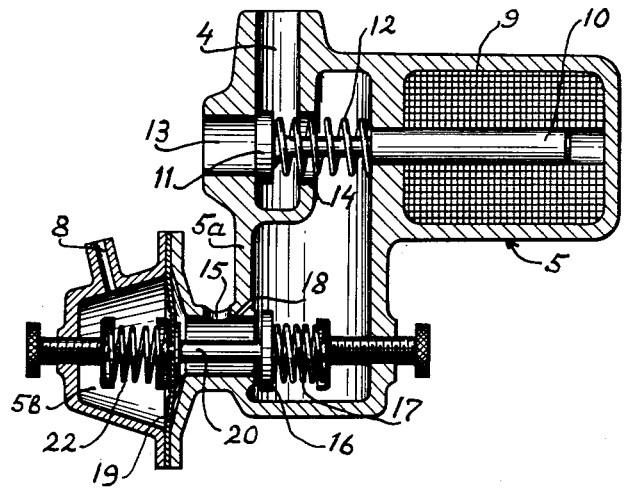
FIGURE 3 is similar to FIGURE 2 but shows the valve in the open position when gas is given quickly and therefore a quick engagement of the clutch takes place.

The operating valve 5 is shown in detail in FIGURES 2 and 3. The casing of the valve encloses an electromagnet 9 which is energized by electrical current during the switching operation by means of a switch which is connected with the gear shifting lever, or rod. The electro-magnet 9 is used to release the clutch operation. It includes a magnetic armature 10 which is connected with a valve body, or valve disc 11. A spring 12 presses against the valve disc 11, so that it will close an opening 13 which is connected with the suction pipe 6.

This portion of the device is operated as follows:

When the magnet 9 is supplied with electric current, the armature 10 is attracted and the valve disc 11 is pressed against a valve seat 14, thereby compressing the spring 12. When the passage 13 is connected with the pipe 4 leading to the servo-motor 1 with the result that the clutch is disengaged.

As soon as electrical current ceases to flow in the electro-magnet 9, the spring 12 will press the valve disc 11 back into the position shown in FIGURE 2, wherein it closes the passage 13. Then the pipe 4 is in communication through the interior of the valve casing 5a with an opening 15 provided in the casing for the inflow of atmospheric air. Thus the re-engagement operation for the clutch is started.

In order to provide a slow clutching operation, a reduction valve 16 is located between the opening 15 and the pipe 4 leading to the servo-motor. The reduction valve 16 consists of a disc which is pressed against the valve seat by a spring 17, which may be conveniently adjusted by means of a set-screw. A passage 18 is provided close to the valve seat of the valve 16.

It is apparent that the valve 16 will produce a quick drop of the sub-atmospheric pressure during the re-engagement of the clutch, namely, the clutch will begin to engage quite lightly in the beginning, while the rest of the engagement procedure takes place quite slowly through the passage 18 until the coupling is completely engaged.

The reduction valve 16 may be affected by a diaphragm 19 carrying a rod 20 adapted to engage the valve 16, as shown in FIGURE 3. The rod 20 of the diaphragm 19 is pressed toward the valve 16 by a spring 22, which can be adjusted by a set-screw, and which is located in a casing connected with pipe 8.

The diaphragm 19 is used to additionally influence the reduction valve 16 when gas is quickly given during the change from a lower gear to a higher gear so as to prevent an excessive operation of the motor. The diaphragm 19 is connected with the suction pipe 6 through the pipe 8. The bolt 20 carried by the diaphragm 19 can be pressed against the valve 16 so as to open the valve, or at least to diminish the counter-pressure of the spring 17 in the closing direction of the valve 16.

This device operates as follows:

So long as no gas is given (FIG. 2), the space 5b behind the diaphragm 19 has substantial sub-atmospheric pressure, with the result that the spring 22 is compressed and the bolt 20 is out of engagement with the reduction valve 16. When suddenly gas is given the sub-atmospheric pressure in the suction pipe 6 and, consequently, behind the diaphragm 19 is suddenly diminished, with the result that the spring 22 presses the diaphragm 19 outwardly, and the pin 20 will raise the valve 16, or at least will diminish the pressure of the spring 17 against the valve 16, with the result that a quick engagement of the clutch takes place. This position is shown in FIGURE 3.

FIGURES 4 and 5 show a device of the present invention which prevents in certain driving conditions the influencing of the re-engagement of the clutch by a drop in sub-atmospheric pressure in the suction pipe 6. In the example shown in FIGURES 4 and 5, an additional casing 21a is provided having a passage 21 and a cylindrical chamber 24 located between the passage 21 and the pipe 8. A mass 23 having the shape of a ball is located in the chamber 24, and the diameter of the chamber 24 is only a little greater than the diameter of the ball 23. The ball 23 is so arranged that so long as the movement of the vehicle is retarded, the ball 23 presses against the wall 25 of the casing 24, and thus closes the passage 21. This position is illustrated in FIGURE 5 of the drawings. In this position the connection between the chamber 5b located behind the diaphragm 19, and the motor suction pipe 6 is interrupted. Consequently, when gas is given and the sub-atmospheric pressure is reduced, this reduction will not be effective any more in the chamber behind the diaphragm 19. Thus the clutching procedure will not be accelerated. However, in the case the ball 23 does not close the passage 21 completely, but only partially, the acceleration of the engagement of the clutch will, at any rate, be retarded. The chamber 24 is preferably mounted horizontally and so that it extends in the direction of the movement of the vehicle, which is from left to right (looking in the direction of FIGS. 4 and 6). As soon as the movement of the vehicle is accelerated, the ball 23 will free the passage 21.

Under certain circumstances it is advisable to arrange the chamber 24 at a slight inclination, so that the ball 23 under the action of gravity lies lightly against the wall 24 and thus closes the channel 21 in the normal position.

FIGURE 6 shows diagrammatically a controlling device of the present invention for operating an electro-magnetic clutch. This device comprises several resistances 26, 27, 28 and 29, which can be switched into and out of an electrical circuit by a rod 30. The rod 30 is connected with a piston 31 which is reciprocable within a cylinder 32. The cylinder 32 is connected by a passage 33 and a chamber containing a ball 36 with a passage 34, which is connected to the suction pipe 6 of the motor. A spring 35 is located within the cylinder 32 and presses the piston 31 to the right (looking in the direction of FIGURE 6) to an extreme position in which the electrical circuit of the clutch includes only small resistance, so that the clutch engages fully.

The operation of the device is as follows:

When no gas is given, substantial sub-atmospheric pressure exists within the cylinder 32 through its connection by the conduits 33 and 34 with the suction pipe 6, and then the piston 31 will move to the left to such an extent that the resistances 27, 28 and 29 are included in the electrical circuit of the coupling. Thus the clutch transmits only a small torque. If gas is suddenly given, and if there was a direct connection between the suction pipe 6 and the cylinder 32, the resistances 29 to 26 would be quickly switched off and the clutch would engage quickly. However, through the provision of the ball 36, the passage 33 will be closed so long as the movement of the vehicle is being retarded. Thus a quick switching off of the resistances 29 to 26 and, consequently, a quick engagement of the clutch are prevented, or at least retarded by the operation of the ball 36.

Figure 7:
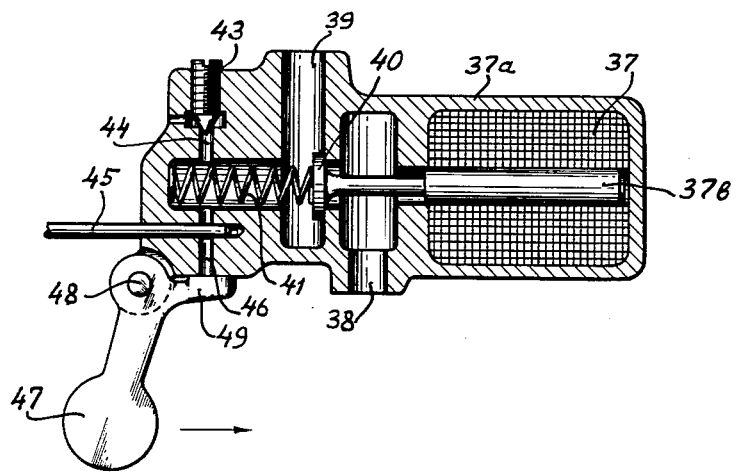
FIGURE 7 shows in section a valve for actuating compressed air.

FIGURES 7 and 7a illustrate, by way of example, a valve of the present invention for operating compressed air supplying means. The valve comprises a casing 37a containing a magnet 37 which actuates a valve disc 40. The casing 37a includes a conduit 38 connected with a source of compressed air. Another conduit 39 leads to the servo-motor 1 of FIGURE 1. The valve plate 40, which is operatively connected with the armature 37b of the magnet 37, is normally pressed by a spring 41 so as to close the passage between the conduits 38 and 39.

The casing 37a includes a narrow passage 44, the size of which is adjustable by a needle valve 43 carried by the casing 37a.

A rod 45, which is used to close the passage 46 within the casing 37a, is operatively connected with the gas operating rod.

A regulating mass 47, which is movable by the forces of inertia, has the form of a weight 47 which is attached by a pivot 48 to the casing 37a, and which is provided with an extension 49 having the form of a short plate, which extends substantially horizontally and which is adapted to close the opening 46.

The device operates as follows:

When the magnet 37 is energized, the armature 37b is moved outwardly with the result that the valve 40 compresses the spring 41 and is pressed against the valve seat 42. Then a connection is established between the compressed air conduit 38 and the conduit 39 leading to the servo-motor. As soon as the electrical circuit of the magnet 37 is interrupted, the spring 41 presses the valve disc 40 back into the position shown in FIGURE 7, so that compressed air can now be blown out from the servo-motor through the passage 44 which is controlled by the needle valve 43.

When gas is given suddenly after the switching, the rod 45 is shifted thereby, so that it will release the passage 46 and compressed air can escape not only through the passage 44, but also through the passage 46. However, this additional opening 46, the purpose of which is to provide a speeding up of the clutching procedure, is closed by the plate 49 of the regulating mass 47 so long as the movement of the vehicle is retarded. However, as soon as the vehicle is accelerated, the mass 47 is swung clockwise about its pivot 48 by the force of inertia, so that the passage 46 is opened for the escape of compressed air.

The above-described examples which have been given by way of illustration only, show that a device constructed in accordance with the principles of the present invention can be adapted to all possible types of automatic clutches having operating means which provide a quick engagement of the coupling when gas is given directly after the gears have been switched on.

A regulating mass of the above-described type, which is affected by the acceleration and retardation of the movement of the vehicle, is also affected by the position of the vehicle in an advantageous manner. When the vehicle is moving up-hill, the regulating mass has a small effect upon the actuating device; this means that the clutching engagement, after gas has been given directly, is braked to a lesser extent during such up-hill movement than when the vehicle is located horizontally or moves down-hill. This is most desirable since during an up-hill movement the brake impact is generally less noticeable during gear switching, and the power of the motor is used up after the switching in the fastest manner so as to restore as quickly as possible the interruption of power taking place during the gear switching. On the other hand, when moving down-hill the motor is often used to a greater extent as a brake, so that the additional delay of the clutching engagement by the regulating mass will not have any undesirable consequences.

The size of the regulating mass can be comparatively small, particularly as far as the examples shown in FIGURES 4 to 6 are concerned. In these constructions the difference in pressure in the front of and behind the ball 23 or 36, will produce an additional force with which the ball will be pressed against the wall 25, or the wall containing the passage 33. In order to eliminate this effect to a great extent, the ratio between the diameter of the ball and the diameter of the channel closed by the ball must be substantially large. Extensive practical experimentation has shown that this ratio should be 15:1, or even larger. In most cases the channel 21, or the channel 33, may have a diameter ranging between 0.8 mm. and 1 mm., while the ball should have a diameter of about 15 to 20 mm.

Thus it is apparent that the described examples are capable of various modifications within the scope of the present invention. All such variations and modifications are to be included within the scope of the present invention.

What is claimed is:

1. An apparatus for operating vehicle clutches, comprising, in combination, a vehicle clutch, a servo-motor connected with said clutch, a pipe connected with said servo-motor, a motor suction pipe, a third pipe connected with said motor suction pipe, a fourth pipe connected with said motor suction pipe and a valve comprising a valve casing having formed therein a passage communicating with the first-mentioned pipe, another passage communicating with said third pipe, a third passage communicating with said fourth pipe, and an opening communicating with the atmosphere, said valve casing comprising a valve seat located between the first-mentioned passage and the second-mentioned passage and another valve seat located between the first- and second-mentioned passages on the one hand and said third passage and said opening on the other hand, a valve disc adapted to engage the first-mentioned valve seat, a spring pressing said valve disc against the first-mentioned valve seat, an electro-magnet within said casing, an armature electromagnetically coupled with said electro-magnet and connected with said valve disc for actuating the same, a reduction valve having a disc adapted to engage the second-mentioned valve seat, an adjustable spring pressing said reduction valve disc against the second-mentioned valve disc, a diaphragm located within said casing and extending between said third passage and said opening, a rod carried by said diaphragm and adapted to engage said reduction valve disc, an adjustable spring located in a space within said casing and engaging said diaphragm for pressing said rod against said reduction valve disc, a single movable regulating mass adapted to close and open communication between said third passage and said space, and means connected with said valve casing and supporting said regulating mass for inertia movements when the movement of the vehicle is accelerated and retarded.

2. An apparatus for operating vehicle clutches, comprising, in combination, a vehicle clutch, a servo-motor connected with said clutch, a pipe connected with said servo-motor, a motor suction pipe, a third pipe connected with said motor suction pipe, a fourth pipe connected with said motor suction pipe and a valve comprising a valve casing having formed therein a passage communicating with the first-mentioned pipe, another passage communicating with said third pipe, a third passage communicating with said fourth pipe, and an opening communicating with the atmosphere, said valve casing comprising a valve seat located between the first-mentioned passage and the second-mentioned passage and another valve seat located between the first- and second-mentioned passages on the one hand and said third passage and said opening on the other hand, a valve disc adapted to engage the first-mentioned valve seat, a spring pressing said valve disc against the first-mentioned valve seat, an electro-magnet within said casing, an armature electro-magnetically coupled with said electro-magnet and connected with said valve disc for actuating the same, a reduction valve having a disc adapted to engage the second-mentioned valve seat, an adjustable spring pressing said reduction valve disc against the second-mentioned valve disc, a diaphragm located within said casing and extending between said third passage and said opening, a rod carried by said diaphragm and adapted to engage said reduction valve disc, an adjustable spring located in a space within said casing and engaging said diaphragm for pressing said rod against said reduction valve disc, an auxiliary casing extending substantially in the direction of movement of the vehicle and connected with said valve casing, said auxiliary casing having openings communicating with said third passage and said space, and a ball constituting a regulating mass and movably located within said auxiliary casing, said auxiliary casing supporting said ball for inertia movements between two walls of the auxiliary casing when the movement of the vehicle is accelerated and retarded, said ball at least partly closing the openings of said auxiliary casing when the movement of the vehicle is retarded.

3. An apparatus for operating vehicle clutches, comprising, in combination, a vehicle clutch, a throttle operated rod, a servo-motor connected with said clutch, a pipe connected with said servo-motor, a source of compressed air, a second pipe connected with said compressed air source, and a valve comprising a valve casing having formed therein a passage communicating with the first-mentioned pipe, another passage communicating with said second pipe, a third passage communicating with the atmosphere, a fourth passage communicating with the atmosphere, said valve casing comprising a valve seat located between the first-mentioned passage and the second-mentioned passage, a valve disc adapted to engage said valve seat, a spring pressing said valve disc against said valve seat, an electro-magnet within said casing, an armature electro-magnetically coupled with said electro-magnet and connected with said valve disc for actuating the same, said third and fourth passages communicating with the first-mentioned passage, a needle valve located in said third passage for adjusting the size thereof, a rod connected with the first-mentioned rod and adapted to be located in said fourth passage for closing said fourth passage, a pivot carried by said valve casing, a single regulating mass swingably supported by said pivot for inertia movements when the movement of the vehicle is accelerated, and a plate carried by said mass and closing said fourth passage, said plate being adapted to open said fourth passage when the movement of the vehicle is accelerated.

4. An apparatus for operating vehicle clutches, comprising, in combination, a vehicle clutch, a servo-motor connected with said clutch, a pipe connected with said servo-motor, a pipe for the actuating fluid, a valve casing having a passage communicating with the first-mentioned pipe, another passage communicating with the second-mentioned pipe, a valve seat located between the first-mentioned and the second-mentioned passages and means constituting a third passage communicating with the atmosphere, a valve disc adapted to engage said valve seat, a spring engaging said valve disc, an electro-magnet within said casing, an armature electro-magnetically coupled with said electro-magnet and connected with said valve disc for actuating the same, a single inertia-actuated movable regulating mass, and means connected with said casing and actuated by the movements of said mass when the movements of the vehicle are accelerated and retarded for interrupting the communication of said third passage with the atmosphere and for re-establishing said communication.

References Cited in the file of this patent

UNITED STATES PATENTS

| | | |
|---|---|---|
| 2,160,051 | Ainsworth | May 30, 1939 |
| 2,237,944 | Maurer | Apr. 8, 1941 |
| 2,252,136 | Price | Aug. 12, 1941 |
| 2,259,810 | Freeman | Oct. 21, 1941 |
| 2,277,584 | Freeman | Mar. 24, 1942 |
| 2,284,189 | Dick | May 26, 1942 |
| 2,624,432 | Randol | Jan. 6, 1953 |
| 2,626,026 | Sherwood et al. | Jan. 20, 1953 |

FOREIGN PATENTS

| | | |
|---|---|---|
| 166,383 | Switzerland | Mar. 1, 1934 |